United States Patent
Duport (10) Patent No.: US 12,510,632 B2
(45) Date of Patent: Dec. 30, 2025

(54) LIDAR SYSTEM COMPRISING TWO DIFFRACTIVE COMPONENTS

(71) Applicants: THALES, Courbevoie (FR); COMMISSARIAT A L'ENERGIE ATOMIQUE ET AUX ENERGIES ALTERNATIVES, Paris (FR)

(72) Inventor: François Duport, Palaiseau (FR)

(73) Assignees: THALES, Courbevoie (FR); COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 863 days.

(21) Appl. No.: 17/787,561

(22) PCT Filed: Dec. 17, 2020

(86) PCT No.: PCT/EP2020/086815
§ 371 (c)(1),
(2) Date: Jun. 20, 2022

(87) PCT Pub. No.: WO2021/123016
PCT Pub. Date: Jun. 24, 2021

(65) Prior Publication Data
US 2022/0404472 A1    Dec. 22, 2022

(30) Foreign Application Priority Data
Dec. 20, 2019    (FR) ........................... 1914898

(51) Int. Cl.
*G01S 7/481*    (2006.01)
*G01S 17/08*    (2006.01)

(52) U.S. Cl.
CPC .......... *G01S 7/4817* (2013.01); *G01S 7/4815* (2013.01); *G01S 17/08* (2013.01)

(58) Field of Classification Search
CPC ..... G01S 7/4817; G01S 7/481; G01S 7/48–51
See application file for complete search history.

(56) References Cited

U.S. PATENT DOCUMENTS

| 2017/0269215 A1 | 9/2017 | Hall et al. |
| 2018/0052378 A1 | 2/2018 | Shin et al. |

(Continued)

FOREIGN PATENT DOCUMENTS

| CN | 209417296 U  * | 9/2019 |
| DE | 10 2015 225 863 A1 | 6/2017 |

(Continued)

*Primary Examiner* — Yuqing Xiao
*Assistant Examiner* — Chia-Ling Chen
(74) *Attorney, Agent, or Firm* — BakerHostetler (57) ABSTRACT

A lidar system includes a laser assembly comprising at least one laser source, the laser assembly being configured to emit a first beam comprising a first comb of separate wavelengths and a second beam comprising a second comb of separate wavelengths different from those of the first comb, the lidar system comprising an optical detecting system for detecting radiation emitted by the laser assembly and reflected by a scene to be observed, wherein the lidar system also comprises, inter alia: a first diffractive optical component configured to direct the first beam toward the scene to be observed in a plurality of different directions for each wavelength of the first comb.

14 Claims, 5 Drawing Sheets

(56) References Cited

U.S. PATENT DOCUMENTS

2019/0196015 A1* 6/2019 Greiner ................. G01S 7/4813
2019/0257927 A1* 8/2019 Yao ....................... G01S 7/4815
2019/0383940 A1* 12/2019 Hebert .................. G01J 3/0205

FOREIGN PATENT DOCUMENTS

JP      2010261776 A  * 11/2010
WO    2017/132704 A1    8/2017

* cited by examiner

LIDAR SYSTEM COMPRISING TWO DIFFRACTIVE COMPONENTS

CROSS-REFERENCE TO RELATED APPLICATIONS

This application is a National Stage of International patent application PCT/EP2020/086815, filed on Dec. 17, 2020, which claims priority to foreign French patent application No. FR 1914898, filed on Dec. 20, 2019, the disclosures of which are incorporated by reference in their entirety.

FIELD OF THE INVENTION

The invention relates to the field of detection by coherent lidar.

BACKGROUND

Lidars use light to measure the distance and potentially the speed of objects or targets. Along the lines of radars, lidar systems need to probe space with an optical beam with a view to detecting in two or three dimensions the observed scene. In general, this involves scanning the space with an optical beam. This results in a scan time that may potentially be detrimental to certain applications. Specifically, while the beam is being directed in a given direction, the scene is not observed in any other direction. In addition, the area covered by the lidar and how rapidly said area is covered depend on the solutions chosen when manufacturing the lidar. A compromise must be reached between a plurality of parameters: the distance covered by the lidar, which is proportional to the power of the laser used, the solid angle covered by the lidar, which depends on the type of application (tracking or escort applications for example), and lastly the rapidity with which the lidar probes the covered area (which in general depends on the type and speed of the targets sought).

In the context of lidar systems, the need to scan the space with an optical beam is often a limiting factor. There are three ways of carrying out this scan:

The first is mainly mechanical. It consists in using a pair consisting of a laser emitter and a laser receiver that both point in the same direction. The assembly is movable in order to be able to scan the space. A plurality of movable mirrors that allow the light beam of the laser emitter to be oriented and the reflected signal to be directed onto the photodetector may also be employed. These scanning devices may optionally be miniaturized using optical MEMS. Although this solution has the advantage of being independent of the wavelength used for the lidar, it however requires a precise alignment of the optical system, and is highly sensitive to vibrations and accelerations, this greatly limiting the envisionable applications.

The second consists in using an interferential optical system to deflect the optical beam. The principle is then to use an interferential optical device to direct each wavelength of the light in one given spatial direction. Generally, it is a question of dividing the optical signal between a plurality of points and of generating a phase shift between these points. The interference between the signals originating from these points is constructive in one given direction. By varying the phase shift between these points, either via the use of phase modulators, or by varying the wavelength of the laser used, the system scans the direction in which the optical beam points. This solution has the advantage of not requiring any moving parts but places certain constraints on the rapidity of tunability of the laser and its reproducibility. In addition, it is only possible to obtain a wide angular scan about two axes if a plurality of interferential systems are used and their use is switched between to obtain the desired scan. These methods are known to those skilled in the art (see US2018/052378 and DE102015225863).

The third consists in using a strip of photodiodes. Each photodiode is tasked with detecting the optical signal originating from the observed scene in a given direction. This solution makes it possible to observe only one axis of the scene, i.e. either a row or a column of the image to be produced. Moreover, solutions based on a matrix array of photodetectors do not allow the speeds of objects to be measured.

It is also known to use a combination of these solutions. For example the systems of US 2017/0269215A1 and WO2017/132704A1 use photodetector strips mounted on a movable turret.

However, all of the existing beam-scanning solutions are either potentially sensitive to vibrations if they are mechanical or provide quite nonuniform scanning angles. In addition, all these solutions, because of the very nature of the scan, allow each direction in space to be observed only intermittently. A compromise must therefore be made depending on the precision of the scan, its rapidity and its amplitudes.

SUMMARY OF THE INVENTION

The invention aims to mitigate certain of the problems and constraints associated with the angular scan of the laser beam in a lidar system.

To this end, one subject of the invention is a system such as described by the claims. Another subject of the invention is a method of use of such a system.

Thus, one subject of the invention is a lidar system comprising a laser assembly comprising at least one laser source, and an optical detecting system for detecting radiation emitted by the laser assembly and reflected by a scene to be observed, characterized in that:

the laser assembly is configured to emit a first beam comprising a first comb of separate wavelengths $\lambda_i$, $i \in [1; m]$ and a second beam comprising a second comb of separate wavelengths $\lambda_j$, $j \in [n; p]$ different from those of the first comb;

the lidar system also comprises a first diffractive optical component configured to direct the first beam toward the scene to be observed in a plurality of different directions $\theta_i \in [1; n]$ for each wavelength $\lambda_i$ of the first comb, said directions being located in a given xz plane that is said to be an azimuthal plane, the laser radiation obtained after diffraction of the first beam by the first diffractive optical component being called the first diffracted radiation;

said lidar system further comprises a second diffractive optical component configured to direct the second beam toward the scene to be observed in a plurality of different directions $\phi_j \in [n; p]$ for each wavelength $\lambda_j$ of the second comb, said directions being located in a given yz plane that is said to be an elevation plane, this plane not being parallel to the azimuthal xz plane, the laser radiation obtained after diffraction of the second beam by the second diffractive optical component being called the second diffracted laser radiation;

the optical detecting system comprises at least one photodiode arranged so as to detect a portion of the first diffracted radiation reflected by the scene to be observed, called the first reflected portion, and a portion of the second diffracted radiation reflected by the scene to be observed, called the second reflected portion, the photodiode being configured to generate a signal comprising the beats of each wavelength $\lambda_i$ of the first reflected portion with each wavelength $\lambda_j$ of the second reflected portion; and the lidar system further comprises a processing unit for processing the signal generated by the photodiode, which unit is configured to determine the position and/or the radial speed of objects present in the scene to be observed, on the basis, at least, of one or more frequencies of said beats comprised in said signal.

According to particular embodiments:

the one or more laser sources of the laser assembly are continuous-wave laser sources with a set phase relationship between the emitted wavelengths, the laser assembly further comprising means suitable for achieving a frequency modulation of the emitted wavelengths;

the one or more laser sources of the laser assembly are pulsed laser sources;

the laser assembly is configured so that there are no two pairs of wavelengths $(\lambda_{i1}, \lambda_{j1})$ and $(\lambda_{i2}, \lambda_{j2})$ such that the frequency of the beat of these two pairs of wavelengths is identical, with $\lambda_{i1}$ and $\lambda_{i2}$ separate wavelengths of the first comb and $\lambda_{j1}$ and $\lambda_{j2}$ separate wavelengths of the second comb;

the laser assembly is configured so that the spectral width $(LS_2)$ of the second wavelength comb is narrower than the free spectral range $(\Delta f_1)$ of the first wavelength comb;

the laser assembly is configured so that the longest wavelength of the first wavelength comb is shorter than the shortest wavelength of the second wavelength comb or so that the shortest wavelength of the first wavelength comb is longer than the longest wavelength of the second wavelength comb;

the optical detecting system further comprises an optical collecting system allowing light rays sourced from the first reflected portion and from the second reflected portion to be focused onto the photodiode;

each diffractive optical component is an integrated optical circuit comprising waveguides that open onto exit faces of the integrated optical circuit and divergent lenses on the exit faces;

the one or more laser sources each emit a total laser power higher than 1 W;

the laser assembly is an optical parametric oscillator comprising a single laser source that pumps a birefringent crystal placed in an optical cavity and configured to emit radiation having a first wavelength and a second wavelength different from the first wavelength, the laser assembly in addition being configured to make said first and second wavelengths vary as a function of time so as to form said first and second wavelength combs, respectively;

the laser assembly comprises two laser sources, a first laser source emitting said first beam and a second laser source emitting said second beam;

the first laser source is a wavelength-tunable laser source configured to emit radiation having a first wavelength and to make said first wavelength vary as a function of time so as to form said first wavelength comb and wherein the second laser source is a wavelength-tunable source configured to emit radiation having a second wavelength and to make said second wavelength vary as a function of time so as to form said second wavelength comb;

each laser source is a mode-locked pulsed laser source, said wavelength combs being emitted simultaneously.

Another subject of the invention is a method of use of a lidar system, comprising the following steps:

emitting a first laser beam comprising a first comb of separate wavelengths $\lambda_i$, i∈[1; m] and a second laser beam comprising a second comb of separate wavelengths $\lambda_j$, i∈[n; p] different from those of the first beam;

diffracting, by means of a first optical component, the first laser beam toward a scene to be observed in one different direction $\theta_i$∈[1; n] for each wavelength of the first comb, said directions being located in a given plane that is said to be an azimuthal plane;

diffracting, by means of a second optical component, the second laser beam toward the scene to be observed in one different direction $\phi_i$∈[n; p] for each wavelength $\lambda_j$ of the second comb, said directions being located in a given plane that is said to be an elevation plane;

detecting a portion of the first beam reflected by the scene to be observed, called the first reflected portion, and a portion of the second beam reflected by the scene to be observed, called the second reflected portion;

generating a signal comprising the beats of each wavelength $\lambda_i$ of the first reflected portion with each wavelength $\lambda_j$ of the second reflected portion;

determining the position and/or the radial speed of objects present in the scene to be observed, on the basis, at least, of the one or more beat frequencies comprised in said signal.

BRIEF DESCRIPTION OF THE DRAWINGS

Other features, details and advantages of the invention will become more clearly apparent on reading the description given with reference to the appended drawings, which drawings are given by way of example and show, respectively.

References to the figures, when they are identical, correspond to the same elements.

In the figures, unless indicated otherwise, the elements are not shown to scale and the (x, y, z) axes form a direct orthonormal coordinate system.

DETAILED DESCRIPTION

Figure 1:
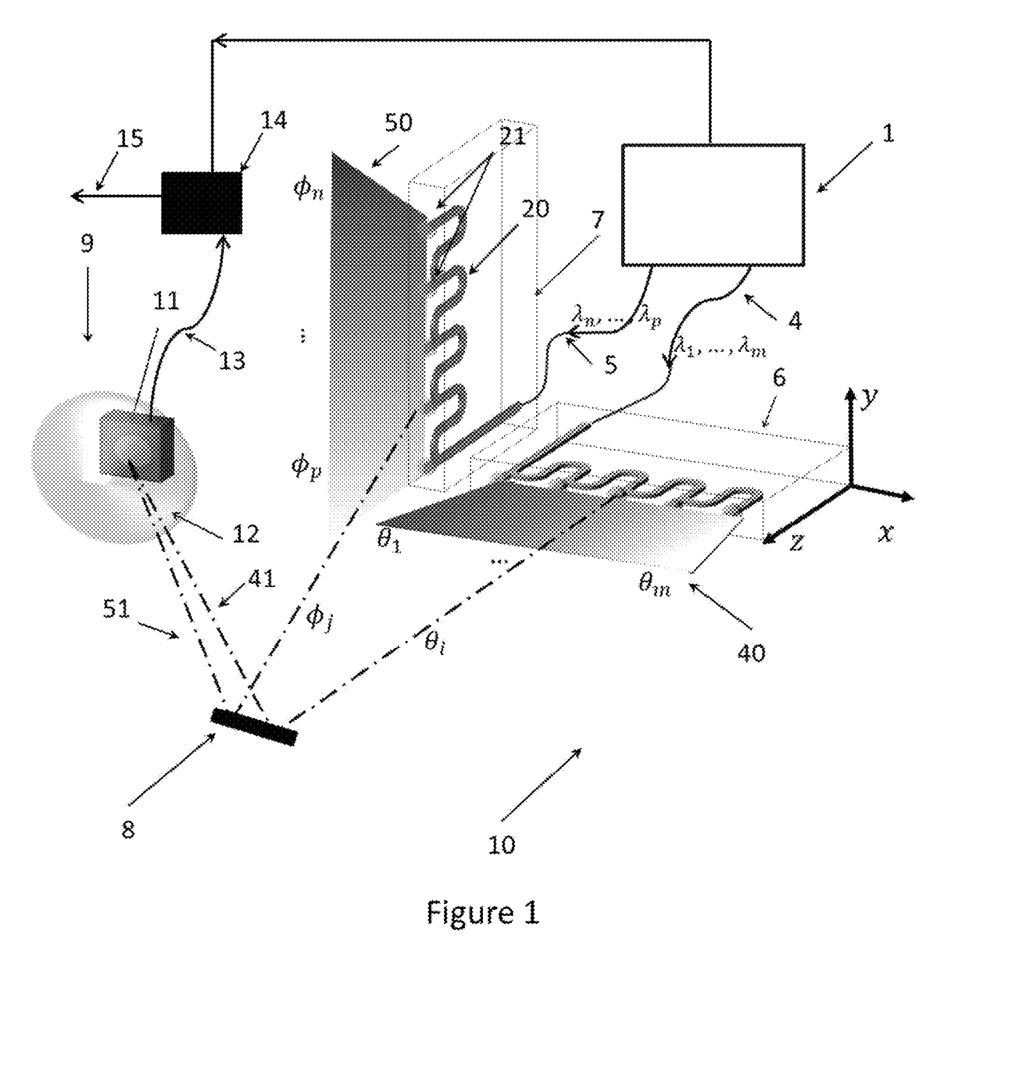
FIG. 1 a schematic view of the lidar system of the invention.

FIG. 1 illustrates a lidar according to the invention. The lidar system 10 is a coherent lidar system and comprises a laser assembly 1, comprising at least one laser source, configured to emit a first beam 4 comprising a first comb of separate wavelengths $\lambda_i$, i∈[1; m] and a second beam 5 comprising a second comb of separate wavelengths $\lambda_j$, j∈[n; p] different from those of the first comb. By comb of m frequencies what is meant here is a spectrum having a frequency-domain representation consisting in a discrete succession of a plurality m of frequencies, regularly spaced apart by a frequency called the free spectral range Δf. A wavelength comb is the representation in the space domain of a frequency comb. The free spectral range of the first and second combs is called $\Delta f_1$ and $\Delta f_2$, respectively. The total spectral width of the first and second combs is called $LS_1$ and $LS_2$, respectively.

According to one embodiment of the invention, the laser assembly is configured to operate in pulsed regime.

Alternatively, according to another embodiment, the one or more laser sources of the laser assembly are continuous-wave laser sources with a set phase relationship between the emitted wavelengths, the laser assembly further comprising means for achieving a frequency modulation of the emitted wavelengths. To achieve this modulation, a plurality of components may be used: an acousto-optic modulator or indeed a double Mach-Zehnder modulator such as those used for coherent optical transmissions (such a modulator also being called an IQ modulator) and that is biased so as to apply a shift to the optical frequency. This frequency modulation allows, at the end of a final step, the position of at least one reflecting object present in the scene to be observed to be determined.

The first beam 4 and the second beam 5 are both guided toward a respective diffractive optical component, a first diffractive optical component 6 and a second diffractive optical component 7. According to an example illustrated in FIG. 1, the two beams are guided using two optical fibers, but propagation in free space is also possible.

The first diffractive optical component is configured to direct the first beam toward the scene to be observed in one different direction $\theta_i \in [1;m]$ for each wavelength $\lambda_i$ of the first comb, said directions being located in a given xz plane that is said to be an azimuthal plane. The second diffractive optical component is configured to direct the second beam toward the scene to be observed in one different direction $\phi_j \in [m; p]$ for each wavelength $\lambda_j$ of the second comb, said directions being located in a given yz plane that is said to be an elevation plane, this plane not being parallel to the azimuthal xz plane. Preferably, the angle made between the two planes is comprised between 10° and 90°, preferably between 30° and 90°, and preferably between 60° and 90°. Preferably, the angle between the two planes is equal to 90°. Below the terms "azimuth" and "direction $\theta_i$" will be used equivalently and the terms "elevation" and "direction $\phi_j$" will be used equivalently.

According to one preferred embodiment, each of the diffractive optical components is an integrated optical circuit comprising waveguides 20 that open onto exit faces of the integrated optical circuit and divergent lenses 21 on the exit faces. The exits are aligned and regularly spaced apart along the x-axis and each exit possesses a constant optical delay with respect to the preceding exit. For each diffractive optical component, by generating a suitable phase shift between the various exits by way of the optical delay between said exits, the interference between the beams output via the exits can be made to be constructive solely in one given direction, in the manner of a diffraction grating. In one non-limiting example, considering guides with a refractive index of 1.9, a spacing between the optical exits of the diffractive optical component of 15 µm and a comb of 11 wavelengths spaced apart by 1 GHz about a central wavelength of 1.55 µm, an optical delay of 22 cm between each consecutive exit of the passive device allows a deflection angle larger than 90° to be covered. These diffractive components make possible an alignment that is both easy to achieve and robust to shocks and vibrations.

In another embodiment, the diffractive optical component is a reflection or transmission, amplitude or phase, diffraction grating.

Figure 2A:
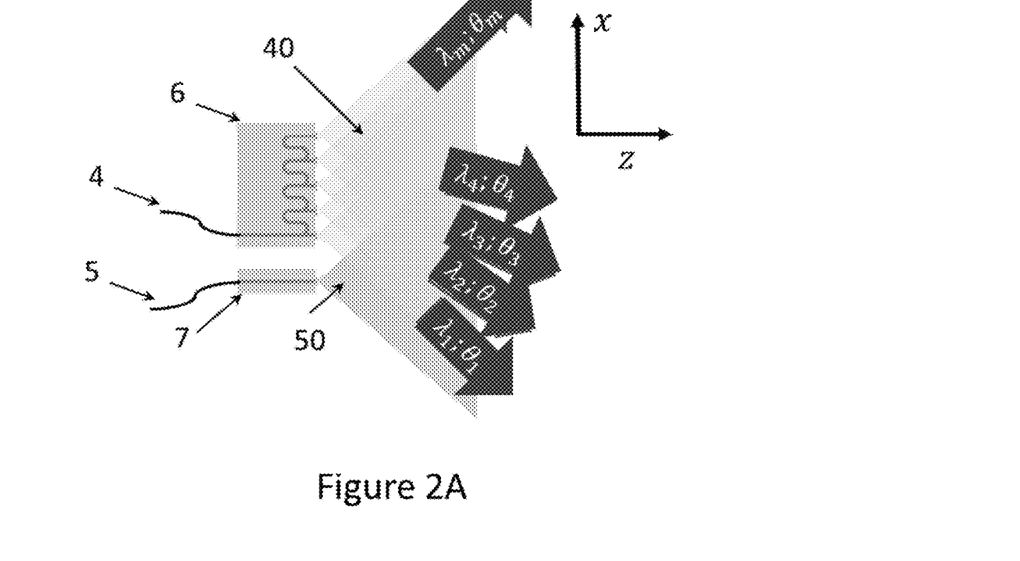
FIG. 2A-FIG. 2B, a top and side view of the operation of the diffractive optical components of the system of the invention, respectively.
Figure 2B:
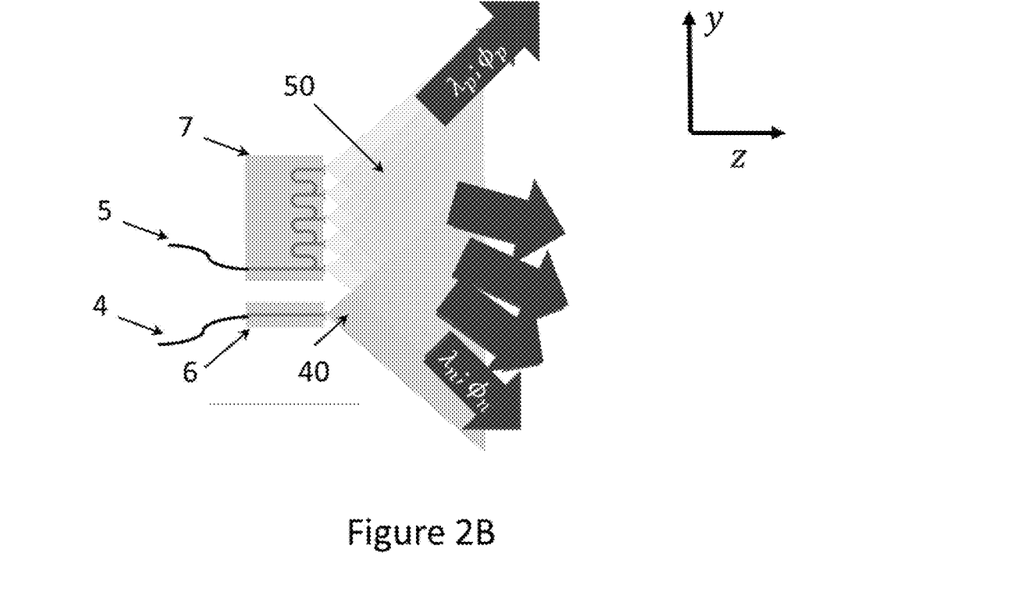

FIGS. 2A and 2B illustrate a top and side view of the operation of the diffractive optical components of the lidar system of the invention, respectively.

On exiting the diffractive optical components each wavelength $\lambda_i$ ($\lambda_j$, respectively) emitted by the laser system is radiated in one different direction $\theta_i$ ($\phi_j$, respectively) in the xz plane (yz plane, respectively) so as to cover, in each azimuthal and elevation plane, an angle of about 90°, and preferably of about 180°.

The laser radiation obtained after diffraction of the first beam by the first diffractive optical component, which radiation is called the first diffracted laser radiation 40, therefore allows the space of the observed scene to be sampled in the azimuthal xz plane by virtue of the spatial separation of the wavelengths. Likewise, the laser radiation obtained after diffraction of the second beam by the second diffractive optical component, which radiation is called the second diffracted laser radiation 50, allows the space of the observed scene to be sampled in the elevation yz plane by virtue of the spatial separation of the wavelengths.

The lidar system in addition comprises an optical detecting system 9 comprising at least one photodetector 11 arranged so as to detect a portion of the first diffracted radiation 40 reflected by an object of the scene to be observed 8, called the first reflected portion 41, and a portion of the second diffracted radiation 50 reflected by an object of the scene to be observed 8, called the second reflected portion 51. Typically, the photodetector is an avalanche photodiode having an advantageously low detection threshold.

Thus, the photodetector 11 generates a signal 13 comprising the beats of each wavelength $\lambda_i$ of the first reflected portion with each wavelength $\lambda_j$ of the second reflected portion.

In the invention, the lidar system further comprises a processing unit 14 for processing the signal generated by the photodiode 11, which unit is configured to determine the position and/or the radial speed of objects present in the scene to be observed, on the basis, at least, of one or more beat frequencies comprised in the signal generated by the photodiode.

To this end, the processing unit is configured to:
compute the spectrum of the signal generated by the photodiode 13;
determine the position and/or the radial speed of objects present in the scene to be observed, on the basis, at least, of one or more beat frequencies contained in said spectrum; and
generate an output signal 15 representative of the position and/or the radial speed of objects present in the scene to be observed.

Each beat of the signal at the frequency $f_i - f_j$, with $f_i = c/\lambda_i$ and $f_j = c/\lambda_j$, c being the speed of light, indicates the presence of an object in a direction $\theta_i$ in the xz plane and a direction $\phi_j$ in the yz plane of the scene to be observed reflecting a portion of the first and second radiation diffracted toward the photodetector.

Specifically, let it be assumed that an object of the scene to be observed is located in a direction $\phi_j$ in the elevation plane and a direction $\theta_i$ in the azimuthal plane with respect to the diffractive components, such that it reflects toward the optical detecting system a portion of the first and second diffracted radiation therefore comprising the wavelength $\lambda_j$ and the wavelength $\lambda_i$, respectively. The photodetector is configured to generate a signal comprising the beat of the wavelength $\lambda_j$ with the wavelength $\lambda_i$. On the basis of this signal, the processing unit is configured to compute the spectrum of the radiation detected by the photodetector. The electrical spectrum will then comprise a component at the frequency $f_i-f_j$ with $f_i=c/\lambda_i$ and $f_j=c/\lambda_j$. For a single combination of wavelengths of the first and second comb ($\lambda_i$, $\lambda_j$) giving a certain beat frequency $f_i-f_j$, it is therefore possible to determine the object directions $\theta_i$ and $\phi_j$ associated with this combination of wavelengths. The distance of the object is determined by the time of flight of the laser wave. To this end, the trigger of the laser pulses (or the frequency modulation in the case where the one or more laser sources of the laser assembly are frequency-modulated continuous-wave laser sources) is synchronized with the processing unit. Thus, the processing unit is connected to the laser assembly.

By virtue of the directions $\theta_i$ and $\phi_j$ of the object (or its azimuth and elevation) and its distance, the processing unit is able to determine the position of the object.

The radial speed of this object is determined by the processing unit 14 via the frequency shift due to the Doppler effect of a beat frequency with respect to the frequency $f_i-f_j$.

By analyzing all the frequency components $f_i-f_j$ of the spectrum of the signal generated by the photodetector it is possible to reconstruct the observed scene using simple, direct and unambiguous processing operations. The reconstruction of the scene is rapid, because it does not require any part of the device to be scanned mechanically. In addition, the lidar system 10 has no moving parts, this making the measurements of radial speeds and of position robust to vibrations and high accelerations.

In all the embodiments of the invention, the lidar system comprises no local oscillator with which the two reflected portions may beat. The beats are obtained via interference of the two reflected portions with each other. In order to prevent the detection probability from becoming too low, it is therefore necessary for the laser assembly to be configured so that the first beam and the second beam are emitted with a power higher than 1 W, and preferably of 3 W. In another embodiment, the laser assembly is configured so that the first and second beam are emitted with a power allowing any risk of harm to eyes or skin during use to be avoided. To this end, the sum of the laser powers of the first and second beam will be kept lower than 250 mW at 1550 nm for a nominal ocular hazard distance of 10 cm and a beam angle of 90° at the exit of each diffractive optical component.

When the two wavelength combs are chosen so that there is no detection ambiguity between the various combinations of beat frequencies, it is therefore possible to determine the direction $\phi_j$ in the elevation plane and the direction $\theta_i$ in the azimuthal plane of the object of the scene to be observed on the basis of the beat frequency $f_i-f_j$. By detection ambiguity, what is meant here is that the beat of a first wavelength $\lambda_{i1}$ of the first comb with a first wavelength $\lambda_{j1}$ of the second comb is at the same frequency as the beat of a second wavelength $\lambda_{i2}$ of the first comb with a second wavelength $\lambda_{j2}$ of the second comb. Thus, the laser assembly is configured so that there are no two pairs of separate wavelengths ($\lambda_{i1}$, $\lambda_{j1}$) and ($\lambda_{i2}$, $\lambda_{j2}$) such that the frequency of the beat of these two pairs of wavelengths is identical. In other words, the laser is configured so that there are no two pairs of wavelengths ($\lambda_{i1}$, $\lambda_{j1}$) and ($\lambda_{i2}$, $\lambda_{j2}$) such that:

$$\frac{c}{\lambda_{i1}} - \frac{c}{\lambda_{j1}} = \frac{c}{\lambda_{i2}} - \frac{c}{\lambda_{j2}} \qquad \text{[Math 1]}$$

To avoid these ambiguities, according to one preferred embodiment the laser assembly is also configured so that the spectral width ($LS_2$) of the second wavelength comb is narrower than the free spectral range $\Delta f_1$ of the first wavelength comb. This solution is the simplest to obtain experimentally. This solution is illustrated in FIG. 3, which shows the power P of the wavelengths $\lambda$ of the two combs.

Figure 3:
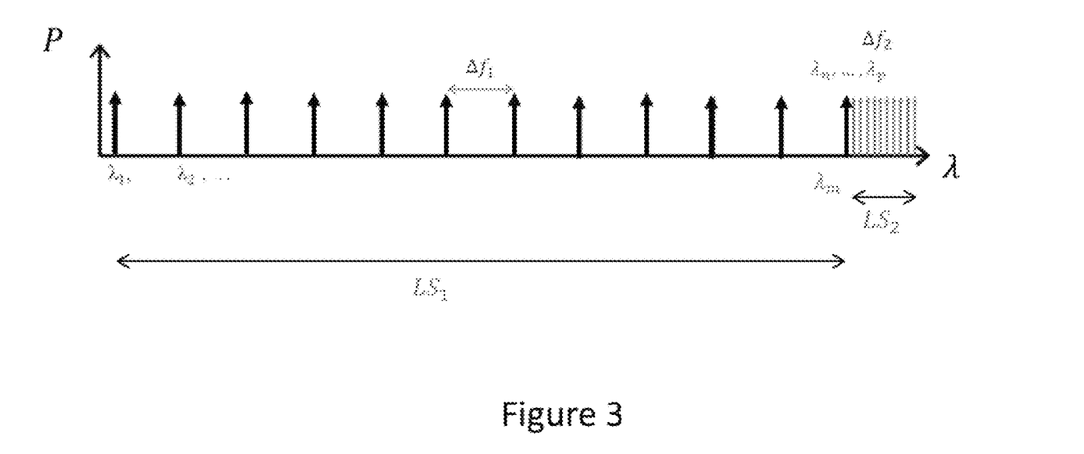
FIG. 3 a representation of two wavelength combs generated by the laser assembly of the lidar system of the invention.

In the example of FIG. 3, according to one embodiment, the laser assembly is further configured so that the longest wavelength of the first wavelength comb is shorter than the shortest wavelength of the second wavelength comb.

Alternatively, in another embodiment, the laser assembly is configured so that the shortest wavelength of the first wavelength comb is longer than the longest wavelength of the second wavelength comb.

The number of wavelengths in each comb sets the angular resolution of the lidar device 10.

The radial-speed resolution is set by the minimum frequency spacing between two frequency components of the spectrum, i.e. by the smallest of the free spectral range $\Delta f_1$ of the first comb and the free spectral range $\Delta f_2$ of the second comb. In the embodiment of FIG. 3, the speed resolution is therefore set by the free spectral range $\Delta f_2$ of the second comb. Thus, the maximum Doppler frequency shift measurable $\Delta f_{max}$ is:

$$\Delta f_{max} = \frac{\Delta f_2}{2}. \qquad \text{[Math 2]}$$

In order not to be a factor limiting the measurement of position or of radial speed of objects, the spectral band of detection of the photodetector is wider than or equal to $LS_1+LS_2+\Delta f_2$. Thus, the photodetector is able to detect the beat of each wavelength of the first comb with each wavelength of the second comb, with a speed resolution identical for each beat frequency.

In a lidar application in which the speed of the objects of the scene to be observed is lower, thus decreasing the maximum Doppler frequency shift, it is possible to decrease the free spectral range of the second comb $\Delta f_2$ and thus benefit from a better angular resolution, achieved by increasing the number of wavelengths in the second comb, or from a spectral analysis in a narrow photodetector output band.

Figure 4:
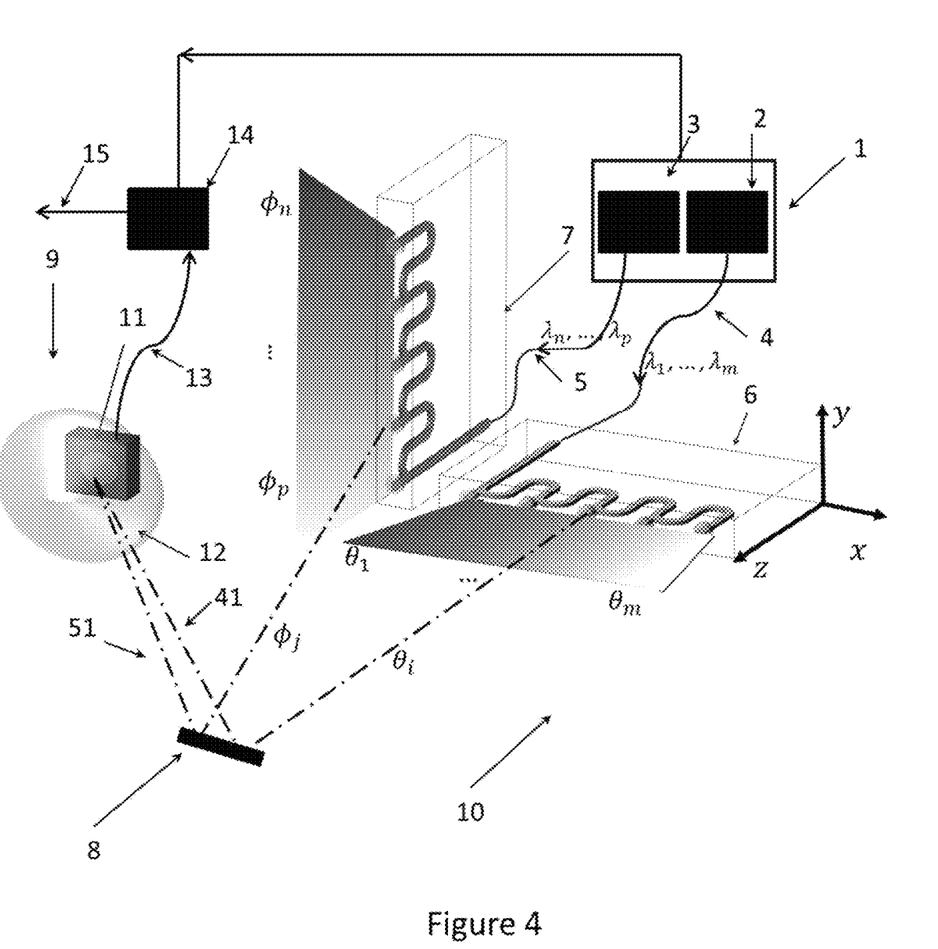
FIG. 4 a schematic view of the lidar system according to a first embodiment of the invention.

FIG. 4 shows a first variant of the invention in which the laser assembly 1 comprises two laser sources, a first laser source 2 emitting said first beam 4 and a second laser source emitting said second beam 5. This first variant enables two options: all the wavelengths of each wavelength comb may be emitted simultaneously (first embodiment) or all the wavelengths of each comb may be emitted in succession one by one over time (second embodiment). By in succession, what is meant is that at the time t the laser assembly emits a first beam comprising a single wavelength $\lambda_i$ of the first comb and a second beam at a single wavelength $\lambda_j$ of the second comb then, at the time t', the laser assembly emits a first beam comprising a single wavelength $\lambda_{i+1}$ of the first comb and a second beam at a single wavelength $\lambda_{j+1}$ of the second comb.

In the first embodiment of the first variant each laser source of the laser assembly is a mode-locked pulsed laser source. Thus, the first laser source is configured to simultaneously emit all the wavelengths of the first comb $\lambda_i$, $j \in [1; m]$ and the second source is configured to simultaneously emit all the wavelengths of the second comb $\lambda_j$, $j \in [n; p]$. In this embodiment, it is necessary for the mode-locked lasers to be stable and to not need to be servo-controlled to guarantee their stability. Alternatively, it is possible to sample one mode of one of the two laser sources, which laser is then called the master laser, with a view to injecting it into the other laser, which is then called the slave laser, in order to servo-control the slave laser using the master laser. This makes it possible to guarantee that the comb emitted by the slave laser will have a high stability with respect to the comb emitted by the master laser.

By way of example given non-limitingly, the first wavelength comb comprises 12 separate wavelengths $\lambda_i$, $i \in [1; 12]$ all spaced apart by $\Delta f_1 = 1$ GHz with the first wavelength $\lambda_1$ of the first comb comprised between 1 µm and 2 µm. The second comb comprises ten separate wavelengths $\lambda_j$, $i \in [13; 22]$ all spaced apart by $\Delta f_2 = 100$ MHz with the first wavelength $\lambda_{13}$ of the second comb longer than the last wavelength $\lambda_{12}$ of the first comb. Thus, in this precise example, the integer part of the beat frequency detected by the photodetector and determined using the processing unit 14 gives the azimuth of the reflecting object and the decimal part gives its elevation. This allows the steps of determining the radial speed and/or the position of objects, which steps are carried out by the processing unit 14, to be simplified.

In this example, each of the diffractive optical components is an integrated optical circuit comprising waveguides 20 with an effective index of 1.9 opening onto exit faces of the integrated optical circuit and divergent lenses 21 on the exit faces. The exits are aligned and spaced apart by 15 µm along the x-axis in the first diffractive optical component and by 15 µm along the y-axis in the second diffractive optical component and each exit possesses an optical delay of 22 cm with respect to the preceding exit in the first diffractive optical component and of 220 cm in the second diffractive optical component. Each diffractive component allows an angle of about 90° to be covered with the various directions $\theta_j$ and $\phi_i$.

In this first embodiment, by measuring all the frequency components $f_i - f_j$ (with $f_i = c/\lambda_i$ and $f_j = c/\lambda_j$) of the spectrum of the signal generated by the photodetector it is possible to completely reconstruct the observed scene instantaneously in a single measurement. In contrast to lidar systems using known prior-art interferential devices, the embodiment of FIG. 1 therefore allows a scene to be observed in a plurality of directions simultaneously and therefore the constraints and disadvantages associated with the wavelength scan of the laser beam required in certain lidars using interferometry systems (slowness, repeatability, etc.) to be avoided.

In a second embodiment of the first variant, the laser assembly once again comprises a first laser source 2 and a second laser source 3. In this embodiment, the first laser source 2 is a wavelength-tunable laser source configured to emit a first beam having a first wavelength and to make said first wavelength vary as a function of time so as to form said first wavelength comb. The second laser source 3 is also a wavelength-tunable source configured to emit a second beam having a second wavelength and to make said second wavelength vary as a function of time so as to form said second wavelength comb. In this embodiment, in which the wavelengths of each comb are obtained in succession one by one over time via a wavelength scan, the scene is reconstructed at the end of the wavelength scan. This second embodiment of the first variant allows either the total power output by each laser to be decreased relative to the first embodiment (typically by a factor of 10), or the range of the lidar to be increased for an identical power output from each laser relative to the first embodiment (typically by a factor of 3). Lastly, this second embodiment allows the scan of a particular region of space to be refined by carrying out continuous but slower tuning of the wavelengths in a particular range of the spectrum of each tunable laser, these wavelengths being radiated in directions corresponding to the region of space to be analyzed more finely.

Figure 5:
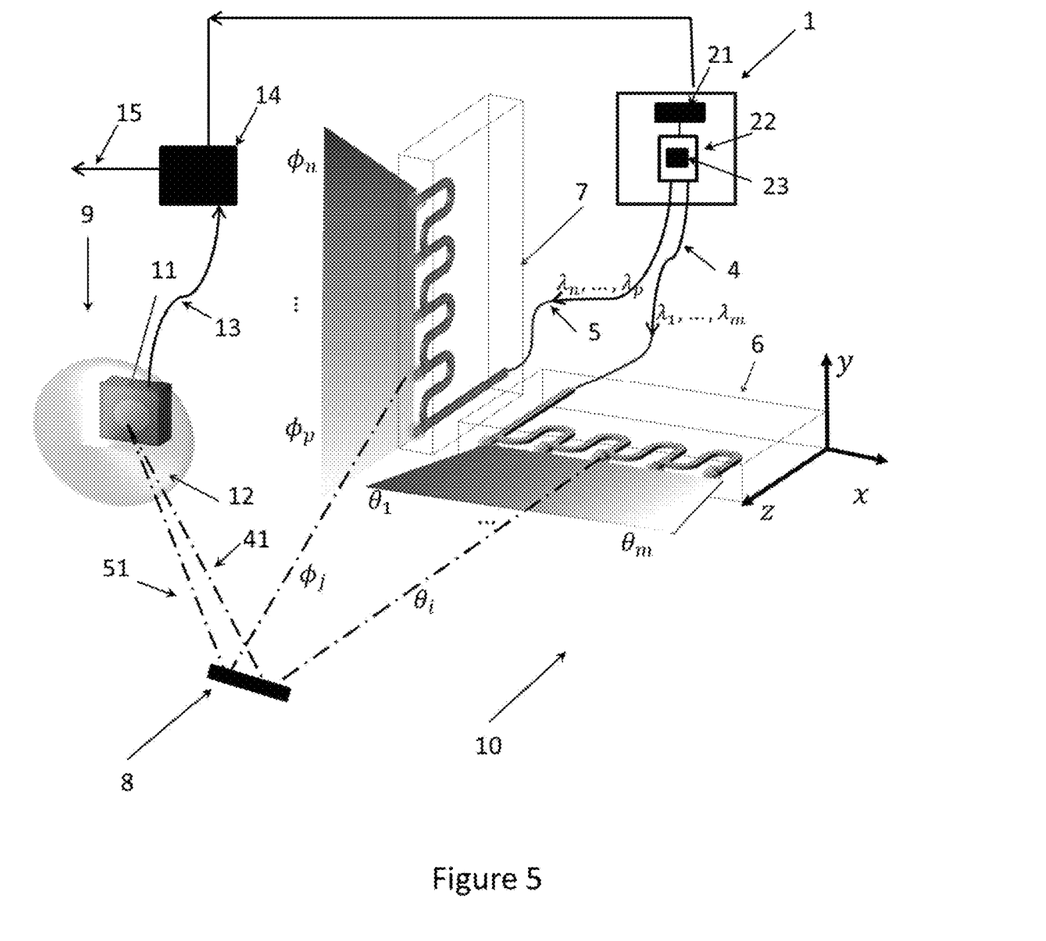
FIG. 5 a schematic view of the lidar system according to a second embodiment of the invention.

FIG. 5 illustrates a second variant of the invention. In said variant the laser assembly is an optical parametric oscillator (OPO) comprising a single laser source 21 that illuminates a birefringent crystal 22 placed in an optical cavity 23. The laser source 21 pumps the birefringent crystal and makes it possible to obtain as output from the crystal and the cavity a "signal" first beam having a first wavelength ("signal" wavelength of the OPO) and an "idler" second beam at a second wavelength different from the first wavelength ("idler" wavelength of the OPO). By carrying out type-II birefringent phase matching, the laser assembly is configured so that the signal and idler wavelengths can be changed continuously via a simple rotation of the nonlinear crystal. Here, type-II phase matching means that the signal and idler beams have perpendicular polarizations when they exit the crystal. By changing the angle between the pump beam generated by the laser source 21 and the crystal, the phase-matching condition will be met for different signal and idler wavelengths. Thus, using a rotation of the crystal, the laser assembly is configured to make said first and second wavelengths vary as a function of time so as to form said first and second wavelength combs, respectively.

In this variant, the scene is reconstructed at the end of the wavelength scan. The advantages are the same as for the second embodiment of the first variant.

According to one embodiment, the optical detecting system further comprises an optical collecting system 12 allowing the light rays of the first and second beams that were reflected by the scene to be observed to be focused onto the photodiode. This optical system may be a convergent lens or a set of lenses forming an objective of high numerical aperture.

The invention claimed is:

1. A method of use of a lidar system, comprising the following steps:
   a. emitting a first laser beam comprising a first comb of separate wavelengths $\lambda_i$, $i \in [1; m]$ and a second laser beam comprising a second comb of separate wavelengths $\lambda_j$, $i \in [n; p]$ different from those of the first beam;
   b. diffracting, by means of a first optical component, the first laser beam toward a scene to be observed in one different direction $\theta_i \in [1; m]$ for each wavelength $\lambda_i$ of the first comb, said directions being located in a given plane that is said to be an azimuthal plane;
   c. diffracting, by means of a second optical component, the second laser beam toward the scene to be observed in one different direction $\phi_i \in [n; p]$ for each wavelength $\lambda_j$ of the second comb, said directions being located in a given plane that is said to be an elevation plane;
   d. detecting a portion of a first beam reflected by the scene to be observed, being a first reflected portion, and a portion of a second beam reflected by the scene to be observed, being a second reflected portion;
   e. generating a signal comprising beats of each wavelength $\lambda_i$ of the first reflected portion with each wavelength $\lambda_j$ of the second reflected portion;
   f. determining a position and/or a radial speed of objects present in the scene to be observed, on the basis, at least, of the one or more beat frequencies comprised in said signal.

2. A lidar system comprising a laser assembly comprising at least one laser source, and an optical detecting system for detecting radiation emitted by the laser assembly and reflected by a scene to be observed, wherein:
- the laser assembly is configured to emit a first beam comprising a first comb of separate wavelengths $\lambda_i$, $i \in [1; m]$ and a second beam comprising a second comb of separate wavelengths $\lambda_j$, $j \in [n; p]$ different from those of the first comb;
- the lidar system also comprises a first diffractive optical component configured to direct the first beam toward the scene to be observed in a plurality of different directions $\in_i \in [1; m]$ for each wavelength $\lambda_i$ of the first comb, said directions being located in a given xz plane that is said to be an azimuthal plane, a laser radiation obtained after diffraction of the first beam by the first diffractive optical component being a first diffracted radiation;
- said lidar system further comprises a second diffractive optical component configured to direct the second beam toward the scene to be observed in a plurality of different directions $\phi_j \in [n; p]$ for each wavelength $\lambda_j$ of the second comb, said directions being located in a given yz plane that is said to be an elevation plane, this plane not being parallel to the azimuthal xz plane, a laser radiation obtained after diffraction of the second beam by the second diffractive optical component being a second diffracted laser radiation;
- the optical detecting system comprises at least one photodiode arranged so as to detect a portion of the first diffracted radiation reflected by the scene to be observed, being a first reflected portion, and a portion of the second diffracted radiation reflected by the scene to be observed, being a second reflected portion, the at least one photodiode being configured to generate a signal comprising beats of each wavelength $\lambda_i$ of the first reflected portion with each wavelength $\lambda_j$ of the second reflected portion; and
- the lidar system further comprises a processing unit for processing a signal generated by the at least one photodiode, which unit is configured to determine a position and/or a radial speed of objects present in the scene to be observed, on the basis, at least, of one or more frequencies of said beats comprised in said signal.

3. The lidar system as claimed in claim 2, wherein the one or more laser sources of the laser assembly are continuous-wave laser sources with a set phase relationship between the emitted wavelengths of the first comb and of the second comb, the laser assembly further comprising means suitable for achieving a frequency modulation of the emitted wavelengths.

4. The lidar system as claimed in claim 2, wherein the one or more laser sources of the laser assembly are pulsed laser sources.

5. The lidar system as claimed in claim 2, wherein the laser assembly is configured so that there are no two pairs of wavelengths $(\lambda_{i1}, \lambda_{j1})$ and $(\lambda_{i2}, \lambda_{j2})$ such that a frequency of the beat of these two pairs of wavelengths is identical, with $\lambda_{i1}$ and $\lambda_{i2}$ separate wavelengths of the first comb and $\lambda_{j1}$ and $\lambda_{j2}$ separate wavelengths of the second comb.

6. The lidar system as claimed in claim 2, wherein the laser assembly is configured so that a spectral width ($LS_2$) of the second wavelength comb is narrower than a free spectral range ($\Delta f_1$) of the first wavelength comb.

7. The lidar system as claimed in claim 2, wherein the laser assembly is configured so that a longest wavelength of the first wavelength comb is shorter than a shortest wavelength of the second wavelength comb or so that a shortest wavelength of the first wavelength comb is longer than a longest wavelength of the second wavelength comb.

8. The lidar system as claimed in claim 2, wherein the optical detecting system further comprises an optical collecting system allowing light rays sourced from the first reflected portion and from the second reflected portion to be focused onto the photodiode.

9. The lidar system as claimed in claim 2, wherein each diffractive optical component is an integrated optical circuit comprising waveguides that open onto exit faces of the integrated optical circuit and divergent lenses on the exit faces.

10. The lidar system as claimed in claim 2, wherein the one or more laser sources each emit a total laser power higher than 1 W.

11. The lidar system as claimed in claim 2, wherein the laser assembly is an optical parametric oscillator comprising a single laser source that pumps a birefringent crystal placed in an optical cavity and configured to emit radiation having a first wavelength and a second wavelength different from the first wavelength, the laser assembly in addition being configured to make said first and second wavelengths vary as a function of time so as to form said first and second wavelength combs, respectively.

12. The lidar system as claimed in claim 2, wherein the laser assembly comprises two laser sources, a first laser source emitting said first beam and a second laser source emitting said second beam.

13. The lidar system as claimed in claim 12, wherein the first laser source is a wavelength-tunable laser source configured to emit radiation having a first wavelength and to make said first wavelength vary as a function of time so as to form said first wavelength comb and wherein the second laser source is a wavelength-tunable source configured to emit radiation having a second wavelength and to make said second wavelength vary as a function of time so as to form said second wavelength comb.

14. The lidar system as claimed in claim 11, wherein the one or more laser sources of the laser assembly are pulsed laser sources, and wherein each laser source is a mode-locked pulsed laser source, said wavelength combs being emitted simultaneously.

* * * * *